United States Patent [19]

Claar et al.

[11] Patent Number: 4,915,736

[45] Date of Patent: Apr. 10, 1990

[54] METHOD OF MODIFYING CERAMIC COMPOSITE BODIES BY CARBURIZATION PROCESS AND ARTICLES PRODUCED THEREBY

[75] Inventors: Terry D. Claar, Newark; Gerhard H. Schiroky, Hockessin, both of Del.

[73] Assignee: Lanxide Technology Company, LP, Newark, Del.

[21] Appl. No.: 137,382

[22] Filed: Dec. 23, 1987

[51] Int. Cl.⁴ .................... B22F 1/00; C22C 29/04
[52] U.S. Cl. .................................. 75/238; 75/244; 419/12; 419/16; 419/17; 419/57; 419/59
[58] Field of Search ............... 75/238, 244; 419/12, 419/16, 17, 57, 59

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,492,670 | 1/1985 | Mizrah et al. | 419/12 |
| 4,544,524 | 10/1985 | Mizrah et al. | 419/12 |
| 4,585,618 | 4/1986 | Fresnel et al. | 419/12 |
| 4,605,440 | 8/1986 | Halverson et al. | 75/238 |
| 4,702,770 | 10/1987 | Pyzik et al. | 75/236 |
| 4,718,941 | 1/1988 | Halverson et al. | 75/236 |
| 4,731,118 | 3/1988 | Svilar et al. | 75/244 X |
| 4,793,859 | 12/1988 | Morelock | 75/244 X |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0193292 | 9/1986 | European Pat. Off. . |

OTHER PUBLICATIONS

"Oxidation of Molten Aluminum Alloys. Reaction with Refractories"—M. Drouzy and M. Richard—Mar. 1974—Fonderie, France No. 332, pp. 121-128.
"Refractories for Aluminum Alloy Melting Furnaces'-'—B. Clavaud and V. Jost—Sep., 1980—Lillian Brassinga (from French), Jan., 1985.

Primary Examiner—Peter A. Nelson
Attorney, Agent, or Firm—Mark G. Mortenson; William E. McShane

[57] ABSTRACT

The present invention relates to a novel method of manufacturing a composite body, such as a $ZrB_2$-$ZrC$-$Zr$ composite body, by utilizing a carburization technique. Moreover, the invention relates to novel products made according to the process. The novel process modifies the residual parent metal which remains in a composite body, by exposing said residual metal to a carburizing environment. Thus, by modifying the composition of residual parent metal, the properties of the resultant composite body can also be modified. Parent metals such as zirconium, titanium, and hafnium are well suited to be treated by the carburizing process according to the present invention.

8 Claims, 1 Drawing Sheet

METHOD OF MODIFYING CERAMIC COMPOSITE BODIES BY CARBURIZATION PROCESS AND ARTICLES PRODUCED THEREBY

FIELD OF THE INVENTION

This invention relates generally to a novel method of manufacturing a composite body, such as a $ZrB_2$-$ZrC$-$Zr$ composite body, by utilizing a carburization technique, and to novel products made thereby. More particularly, the invention relates to a method of modifying a composite body comprising one or more boron-containing compounds (e.g., a boride or a boride and a carbide) which has been made by the reactive infiltration of a molten parent metal into a bed or mass containing boron carbide, and optionally one or more inert fillers, to form the body.

BACKGROUND OF THE INVENTION

In recent years, there has been an increasing interest in the use of ceramics for structural applications historically served by metals. The impetus for this interest has been the relative superiority of ceramics. when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of ceramic boride bodies by the methods of hot pressing, reaction sintering, and reaction hot pressing is well known. While there has been some limited success in producing ceramic boride bodies according to the above-discussed methods, there is still a need for a more effective and economical method to prepare dense boride-containing materials.

In addition, a second major limitation on the use of ceramics for structural applications is that ceramics generally exhibit a lack of toughness (i.e., damage tolerance, or resistance to fracture). Such a lack of toughness tends to result in sudden, easily induced, catastrophic failure of ceramics in application involving rather moderate tensile stresses. This lack of toughness tends to be particularly common in monolithic ceramic boride bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g, ductility). While there has been some general success in the cermet area in the production of boride compounds, there still remains a need for more effective and economical methods to prepare boride-containing materials.

DISCUSSION OF RELATED PATENT APPLICATIONS

Many of the above-discussed problems associated with the production of boride-containing materials have been addressed in co-pending U.S. Pat. Application Ser. No. 073,533, filed in the names of Danny R. White, Michael K. Aghajanian and T. Dennis Claar, on July 15, 1987, and entitled "Process for Preparing Self-Supporting Bodies and Products Made Thereby". The subject matter of Application Serial No. 073,533 (hereinafter referred to as Application '533) is herein expressly incorporated by reference.

The following definitions were used in Application '533 and shall apply to the instant application as well.

"Parent metal" refers to that metal (e.g., zirconium) which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal (e.g. zirconium), the metal identified should be read with this definition in mind unless indicated otherwise by the context.

"Parent metal boride" and "parent metal boro compounds" mean a reaction product containing boron formed upon reaction between boron carbide and the parent metal and includes a binary compound of boron with the parent metal as well as ternary or higher order compounds.

"Parent metal carbide" means a reaction product containing carbon formed upon reaction of boron carbide and parent metal.

Briefly summarizing the disclosure of Application '533, self-supporting ceramic bodies are produced by utilizing a parent metal infiltration and reaction process (i.e., reactive infiltration) in the presence of a boron carbide. Particularly, a bed or mass of boron carbide is infiltrated by molten parent metal, and the bed may be comprised entirely of boron carbide, thus resulting in a self-supporting body comprising one or more parent metal boron-containing compounds, which compounds include a parent metal boride or a parent metal boro carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Application '533, a mass comprising boron carbide is placed adjacent to or in contact with a body of molten metal or metal alloy, which is melted in a substantially inert environment within a particular temperature envelope. The molten metal infiltrates the boron carbide mass and reacts with the boron carbide to form at least one reaction product. The boron carbide is reducible, at least in part, by the molten parent metal, thereby forming the parent metal boron-containing compound (e.g, a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted boron carbide by a wicking or a capillary action. This transported metal forms additional parent metal, boride, carbide, and/or boro carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Application '533, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time.

The typical environment or atmosphere which was utilized in Application '533 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lnthanum, iron, calcium, vanadium, niobium, magnesium, and beryllium.

Thus, Application '533 discloses a novel process, and novel bodies resulting from the process, which overcomes many of the deficiencies of the prior art discussed above, thus satisfying a long-felt need.

SUMMARY OF THE INVENTION

The present invention has been developed in view of the foregoing and to overcome the deficiencies of the prior art.

The invention provides a method for modifying the resultant amount of parent metal present in a composite body. More particularly, the amount of parent metal can be modified or controlled by exposing the composite body (i.e., the residual parent metal in the composite body) to a carburizing environment (e.g., either gaseous carburizing species or a solid carbon material) which modifies the composition of the residual parent metal, thus modifying the properties of the residual parent metal. Moreover, the properties of the resultant composite body can also be modified. Parent metals such as zirconium, titanium, and hafnium are well suited to be treated by the carburizing processes according to the present invention. This application refers primarily to $ZrB_2$-ZrC-Zr composite bodies, hereinafter referred to as "ZBC" composite bodies. However, it should be understood that while specific emphasis has been placed upon ZBC composite bodies, similar manufacturing steps are applicable to titanium and hafnium parent metal composite bodies as well.

Broadly, after forming a ZBC composite according to the process disclosed in Application '533, the ZBC composite is embedded in a graphitic or carbon donor material bedding, which is contained in an appropriate refractory vessel. The filled refractory vessel is heated in, for example, an electric resistance furnace containing an argon atmosphere. During heating, it is believed that small amounts of $H_2O$ or $O_2$ become available for reaction. These small amounts of $H_2O$ or $O_2$ are either intrinsically present in the argon gas or are liberated from the graphite bedding material or the ZBC composite. Thus, upon heating, carbon in the graphitic bedding material can react with oxygen to form a gaseous carburizing species. It also is possible to provide a direct source of a carburizing species, such as, for example, a $CO/CO_2$ mixture or a $H_2/CH_4$ mixture. It is theorized that carbon from the carburizing species dissolves into the $ZrC_{1-x}$ phase in the ZBC composite and the carbon can then be transported throughout the ZBC composite by a vacancy diffusion mechanism. Thus, carbon can be transported so as to contact the residual parent metal to form additional amounts of a parent metal-carbide phase (e.g., if zirconium is the parent metal, the phase $ZrC_{1-x}$ results due to the carburizing treatment). However, some carbon from the graphite bedding material may also be directly diffused into the $ZrC_{1-x}$ phase.

Such carburization is advantageous because it permits conversion of a residual parent metal phase into, for example, a harder and more refractory phase. Specifically, in applications which require high temperature strength, a ZBC composite begins to lose strength at a temperature at or above the melting point of the residual parent metal phase. By post-treating the ZBC composite by a carburization process, the parent metal phase is converted into a carbide of the present metal (e.g., Zr parent metal is converted to ZrC). The amount of parent metal which typically remains in a ZBC composite produced according to the method in Application '533 is about 5–40 volume percent. Upon exposing the ZBC composite to a carburizing species, the amount of residual zirconium parent metal remaining can be reduced to, for example, about 0 to about 2 volume percent.

The modified ZBC composite is useful for aerospace components such as nozzle inserts because the low metal content permits the ZBC composite to be used in even higher temperature applications than previously thought possible, without significantly compromising the fracture toughness and thermal shock resistance of the ZBC composite body. Thus, the carburizing treatment of the present invention is particularly applicable for applications which require a resistance to high temperature erosion, have good thermal shock properties, and have a relatively high elevated temperature strength at a temperature of, for example, 2200–2700° C.

Moreover, because the carburization process is time-dependent, a carburized zone or surface can be created on a ZBC composite body. Thus, an exterior surface of the ZBC composite body can be made to be wear-resistant, while the ZBC composite core retains a high metal content having a corresponding high fracture toughness. Such a ZBC composite body would be particularly applicable in the manufacture of wear plates, wear rings, and impeller inserts for various corrosive and erosive industrial pump applications. Specifically, zirconium metal has a very high corrosion resistance to strong acids, but the metal, by itself, has poor wear characteristics. Thus, by modifying a ZBC composite body, a wear-resistant ceramic outer surface can be formulated with a corrosion-resistive composite interior. Moreover, if substantially all of the zirconium metal is transformed to a $ZrC_{1-x}$ phase, and carburization if continued, it is possible to increase the carbon content in the $ZrC_{1-x}$ phase (e.g., from about $ZrC_{0.58}$ to about $ZrC_{0.96}$). If such conversion is induced to occur, then the hardness and refractory properties of the ZBC composite can be expected to increase.

Thus, the present method, and the novel composite body produced therefrom, even further expand the potential applications for ZBC composite bodies.

DETAILED DESCRIPTION OF THE PREFERRED EMBODIMENTS

Figure 1:
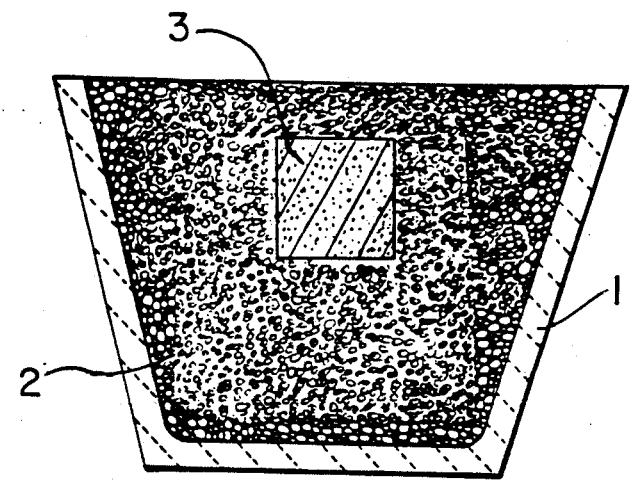
FIG. 1 is a schematic elevational view in crosssection showing a ZBC composite body 3 embedded in a graphitic powder bedding 2 and contained within a refractory vessel 1, to be processed according to the present invention.

The present invention is based on the discovery that the properties of a ceramic composite body, particularly a ceramic composite body which is manufactured by reactive infiltration of a parent metal of zirconium, hafnium or titanium into a boron carbide mass, can be modified by a post-manufacturing carburization treatment. Such a carburization treatment can alter the micro-structure, and thus the resultant mechanical properties, of a portion or substantially all of a ZBC composite body.

A ZBC composite body, produced according to Application '533, can be modified by exposing the composite to a gaseous carburizing species. Such a gaseous carburizing species can be produced by, for example, embedding the ZBC composite body in a graphite bedding and reacting at least a portion of the graphite bedding with moisture or oxygen in a controlled atmosphere furnace. However, the furnace atmosphere should comprise typically, primarily, a non-reactive gas such as argon. The use of argon gas from Matheson Gas Products, Inc., produces desirable results. It is not clear whether impurities present in the argon gas supply the necessary $O_2$ for forming a carburizing species, or whether the argon gas merely serves as a vehicle which contains impurities generated by some type of volatilization of components in the graphitic bedding or in the ZBC composite body. In addition, a gaseous carburizing species could be introduced directly into a controlled atmosphere furnace during heating of the ZBC composite body.

Once the gaseous carburizing species has been introduced into the controlled atmosphere furnace, the layup should be designed in such a manner to permit the carburizing species to be able to contact at least a portion of the surface of the ZBC composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the ZBC composite body, if desired, by a vacancy diffusion process. The diffusion of carbon into the residual zirconium parent metal is quite low. Thus, absence the zirconium carbide phase, it would not be practical, or economical, to attempt to dissolve carbon throughout all of the residual zirconium metal in the ZBC composite body, because the process would take an inordinate amount of time. In this regard, the diffusion of carbon in the zirconium carbide phase and in the zirconium metal phase are both time dependent. However, the rate of transport of carbon in the zirconium carbide phase is much faster than the transport rate of carbon in the zirconium metal phase. Once a desirable amount of carbon has been diffused into the ZBC composite body and contacts residual zirconium parent metal, the zirconium parent metal is converted into ZrC. Such conversion is desirable because the modified ZBC composite will have an increased hardness and an increased elastic modulus, at the limited expense of both flexural strength and toughness. Moreover, the elevated temperature properties will also improve because of a lower metal content in the ZBC composite. It has been discovered that ZBC composites having a residual parent metal in an amount between 5 to 30 volume percent can be modified by a post-carburization treatment to result in about 0 to about 2 volume percent, typically about ½ to about 2 volume percent, of parent metal remaining in the ZBC composite body. Thus, substantially all of the parent metal, however, typically about 4½ to 28 volume percent of the parent metal, can be transformed from zirconium into ZrC.

Moreover, by controlling the time of exposure of the ZBC composite body to the carburizing species and the temperature at which the carburization process occurs, a carburized zone or layer can be formed on the exterior surface of a ZBC composite body. Such process can result in a hard, wear-resistant surface surrounding a core of ZBC composite material having a higher metal content and higher fracture toughness.

In summary, it has been found that by subjecting a ZBC composite containing, typically between about 5–30 volume percent of residual zirconium parent metal, to a carburizing species in a controlled atmosphere furnace operating at a temperature of about 1500–2200° C., for a period of time of about 5–48 hours, in an atmosphere which provides at least some moisture or oxygen, the remainder of the atmosphere being argon, that a ZBC composite will be carburized resulting in a more desirable composite body.

The following is an example of the present invention. The example is intended to be illustrative of various aspects of a post-carburization treatment of a composite body, particularly a ZBC composite body. However, this example should not be construed as limiting the scope of the invention.

EXAMPLE 1

A ZBC composite body formed according to Example 1 disclosed in Application '533 was produced. Table 1 shows various mechanical properties of the formed ZBC composite body. All surfaces of the ZBC composite body were degreased ultrasonically by using acetone and ethanol. The ZBC composite was then buried in a high purity graphite powder bedding having an average particle diameter of about 75 microns. The graphite powder was purchased from Lonza, Inc., and was identified as KS-75. The graphite powder bedding was contained within a graphite mold (Grade ATJ from Union Carbide). The mold was covered on a top surface thereof with a graphite cover plate. The complete assembly of the buried ZBC composite body was then placed into a closed atmosphere resistance heating furnace. The atmosphere in the furnace was argon from Matheson Gas Products, Inc. The furnace was first evacuated at room temperature to a pressure of $1\times10^{-4}$ Torr and thereafter backfilled with argon. The furnace was then evacuated to a pressure of about $1 \times 10^{-2}$ Torr and thereafter heated to a temperature of about 500° C. under vacuum. The furnace was again backfilled with argon which then remained flowing at a rate of about one liter per minute and was maintained at a pressure of about 2 psi. The furnace was heated to a temperature of about 1750° C. over a 6-hour period and then held at 1750° C. for about 12 hours. The furnace was then cooled for about 6 hours. After cooling, the carburized ZBC composite was removed from the furnace and any excess graphite powder was removed by grit blasting.

Table 1 shows the mechanical properties of the ZBC composite after the carburization treatment had been effected. It is evident that the amount of residual zirconium parent metal was reduced from about 10% to about 1/2%, by volume; the hardness, elastic modulus, and shear modulus all increased. However, the increase occurred at the limited expense of flexural strength. It is noted that a flexural strength of about 500 MPa is adequate for many aerospace applications.

TABLE 1

|  | Before Carburization | After Carburization |
|---|---|---|
| Zr Content, vol % | 9.9 | 0.5 |
| Hardness | 80.6 HRA | 81.9 HRA |
|  | 1011 HK | 1388 HK |
| Elastic Modulus, GPa | 364 | 442 |
| Shear Modulus, GPa | 158 | 184 |
| Flexural Strength MPa (4-point) | 875 | 497 |

While the present invention has been disclosed in its preferred embodiments, it is to be understood that the invention is not limited to the precise disclosure contained herein, but may otherwise be embodied in various changes, modifications, and improvements which may occur to those skilled in the art, without departing from the scope of the invention as defined in the appended claims.

We claim:

1. A method of producing a self-supporting body comprising producing a first composite body by:
   selecting a parent metal;
   heating said parent metal in a substantially inert atmosphere to a temperature above its melting point to form a body of molten metal and contacting said body of molten parent metal with a mass comprising boron carbide;
   maintaining said temperature for a time sufficient to permit infiltration of molten parent metal into said mass and to permit reaction of molten parent metal with said boron carbide to form at least one boron-containing compound;
   continuing said infiltration reaction for a time sufficient to produce said self-supporting body comprising at least one parent metal boron-containing compound; and
   subjecting said self-supporting body to a carburizing environment, thereby converting residual parent metal in the self-supporting body into a parent metal-carbide component.

2. The method according to claim 1, wherein the self-supporting body is buried in a graphite powder, and argon gas is contacted with said powder and said self-supporting body, thereby producing a carburizing species at an elevated temperature.

3. The method according to claim 1, wherein a carburizing gas selected from the group consisting of CO/$CO_2$ and $H_2$/$CH_4$ is contacted with said self-supporting body.

4. The method according to claim 1, wherein said carburizing occurs at a temperature of from about 1500–2000° C.

5. The method according to claim 1, wherein said carburizing occurs for a period of time of about 5–48 hours.

6. The method according to claim 1, wherein said carburizing occurs at a temperature of about 1500–2200° C. for a period of time of about 5–48 hours.

7. A composite material comprising a metal phase selected from the group consisting of zirconium, titanium, and hafnium, and present in an amount of about 0.5–2% by volume, and a three-dimensionally interconnected ceramic phase extending to boundaries of said composite material, said ceramic phase comprising a carbide selected from the group consisting of a carbide of zirconium, a carbide of titanium, and a carbide of hafnium, and further comprising a boride of a metal corresponding to said carbide, said boride having a platelet-like structure.

8. The composite of claim 7, wherein said metal phase is zirconium, said carbide is a carbide of zirconium, and said boride is a boride of zirconium.

* * * * *

UNITED STATES PATENT AND TRADEMARK OFFICE
CERTIFICATE OF CORRECTION

PATENT NO. : 4,915,736

DATED : April 10, 1990

INVENTOR(S) : T. Dennis Claar et al.

It is certified that error appears in the above-identified patent and that said Letters Patent is hereby corrected as shown below:

Column 1, line 24:  change "ceramics." to --ceramics,--.
Column 1, line 43:  change "application" to --applications--.
Column 3, line 36:  change "lnthanum" to --lanthanum--.
Column 5, line 13:  change "crosssection" to --cross-section--.
Column 5, line 28:  change "cro-structure" to --crostructure--.
Column 5, line 35:  change "graphite" to --graphitic--.
Column 5, line 36:  change "graphite" to --graphitic--.
Column 5, line 63:  change "absence" to --absent--.
Column 8, line 27:  change "2000°C" to --2200°C--.

Signed and Sealed this

Tenth Day of August, 1993

Attest:

MICHAEL K. KIRK

Attesting Officer

Acting Commissioner of Patents and Trademarks